United States Patent [19]
Llenas et al.

[11] Patent Number: 5,271,626
[45] Date of Patent: Dec. 21, 1993

[54] TELEVISION GAME

[75] Inventors: Montserrat H. Llenas; Esteban R. Llauger, both of Barcelona, Spain; Santiago Pozo, Studio City, Calif.

[73] Assignee: The Arenas Group, Los Angeles, Calif.

[21] Appl. No.: 871,439

[22] Filed: Apr. 21, 1992

[51] Int. Cl.$^5$ .................. A63F 9/22; G09B 7/00; H04N 7/08
[52] U.S. Cl. ............................ 273/430; 358/147; 434/323
[58] Field of Search ............ 273/429, 430, 431, 432, 273/433, 434; 358/142, 146, 147; 434/323

[56] References Cited

U.S. PATENT DOCUMENTS 3,745,240 7/1973 Morchand et al. ............ 358/146 X
4,586,707 5/1986 McNeight et al. ............ 273/430

OTHER PUBLICATIONS

El Sistema Antizapping un Concurso Para Que La Publicidad Se Vea by Francisco Gallardo.

Primary Examiner—William H. Grieb
Attorney, Agent, or Firm—Spensley Horn Jubas & Lubitz

[57] ABSTRACT

A television game for entertaining viewers and maintaining viewership during television programs and commercials. In the illustrated embodiment, black spaces are detected at the ends of television program and commercial signals. Game clues are randomly inserted into the black spaces and displayed on viewers' televisions. At the end of the game, after multiple game clues have been revealed, the viewers report their answers to win prizes.

4 Claims, 10 Drawing Sheets

TELEVISION GAME

BACKGROUND OF THE INVENTION

1. Field of the Invention

The present invention relates to a method and apparatus for providing games and contests which are presented to a television audience.

2. Description of Related Art

Games are one form of recreation that can be enjoyed by many people at the same time. Games and game shows promoted by the media in particular enjoy large, diverse audiences who can participate in the game at home, in the privacy of their living rooms. For example, radio stations often conduct contests. Some radio disc jockeys ask listeners to call in to name the last twenty or so songs played on the particular station. The first winning caller may then win prizes such as money.

Other games which use different forms of the media can be conducted similarly to radio games. Crossword puzzles, for example, are a type of game promoted through the news media, i.e., newspapers. However, today, television appears to be the most far-reaching public medium. Games and contests promoted by television means have been found to be extremely popular and successful. Particularly, since the format and content of television game shows can be designed to accommodate a specific audience, television overall generally enjoys larger audiences than the two previously mentioned forms of the media.

For example, a television game show may be broadcast during prime time television hours between six and seven o'clock weekdays. The production of such television shows, however, tends to be expensive and requires extensive sponsorship for prizes and other production-related costs. One way to reduce costs is to avoid producing an entire television game show to conduct a game and, instead, conducting the game between television programs and the sponsors' commercial breaks. Not only are the costs to publicly broadcast the game minimized, but viewership of both the primary programs and the commercials can be significantly increased.

In order to find new clues to answer the game, viewers must watch the commercials and are thus discouraged from immediately changing television channels when a commercial break begins. Such switching of channels upon the appearance of a commercial break is commonly referred to as "zapping" the commercials. Most likely this term arises from the fact that, today, many homes have televisions equipped with remote control systems which allow viewers to easily move in and out of any television broadcast with merely a "zap" of the remote control.

Because of the tendency for viewers to zap commercials, program sponsors endeavor to produce creative, captivating commercials that will maintain the interest and attention of the particular audience to which the primary broadcast program is directed. For instance, sugared cereal and snack food companies may sponsor commercials which are to be aired during animated cartoon programs on Saturday mornings. During televised sporting events, one may view athletic shoe or alcoholic beverage advertisements. Typically, sponsors will target a particular program that will attract an audience who is likely to be in the market for the sponsor's product.

However, viewers may eventually grow weary of watching the same commercials and zap the commercials to watch other substantive programming. Thus, although it would seem that young teenagers would enjoy watching a commercial reflecting the wild life of a young snowboarder skydiving and parachuting onto a snowy mountain to glide off into the sunset, the young audience may become disinterested or bored with the commercial after watching it a few times. Instead, the audience may zap the commercial and change the channel to watch another teen-oriented program.

Such zapping is often the bane of many sponsors since it defeats the primary purpose for which many sponsors purchase air time. Generally, private sponsorship of most television programs is necessary for television broadcasting. Television networks sell commercial air time to outside sponsors to support the costs of producing and broadcasting the program. Air time is sold by the second, with the values of each second being variable according to the nature of the substantive program during which the commercial will be aired. For example, commercial time during a championship football game is typically more expensive than during a badminton match. The pricing theory is relatively simple. The more viewers watch the main television program, the more viewers will continue to watch the commercials. These viewers will then, either consciously or subconsciously, recognize the sponsors' commercial advertisements and, as a consequence, the sponsors' businesses will benefit.

In an attempt to encourage viewers to watch commercials, one publicity promoter has developed a contest which is conducted during commercial time slots. A different contest is conducted each week. In one example, when a certain program which is aired from eight to nine o'clock each week night is interrupted for a commercial break, a mascot or animal will appear and give some type of clue or hint. The clues will generate a sequence of words which form a phrase or another hint. At the end of the week an address is announced during one of the commercials. The viewers can then mail in their answers to the game. The winning viewers receive prizes or may be entered in some sort of drawing.

One drawback to such a television game, however, is inherent in the use of television air time as a means to convey a message. Television air time is typically very expensive. Particularly, since commercial time is sold in blocks of seconds, rather than individual seconds, the cost to broadcast each commercial can become quite expensive due to a minimum time requirement. For instance, in the above example of the television commercial game, the period of time for each contest spot, or commercial, ranges from seven to ten seconds. However, since the words or clues may actually only require one to two seconds of time, the remaining five to nine seconds may be very expensive wasted time. In addition, substantive programs are typically designed to fit within a specified amount of air time with a definite amount of time allotted for sponsor-paid commercial breaks. If some of the air time allotted for commercial breaks is used for unpaid commercial games, the broadcaster will have less time to broadcast paid commercials.

SUMMARY OF THE DISCLOSURE

One area of television programming that is relatively undeveloped involves the use of "black spaces" that occur between commercials. Often, between the commercials and substantive programs and also between each of the commercials, black spaces may be visible on the television screen. The black spaces vary in length and are controlled at the television station, either manually or automatically. The black spaces generally represent the switching times between commercials. These black spaces may also represent a fade time which has already been inserted into the commercial tape before being sent to a local television station to be broadcast. For aesthetic reasons, an advertiser may want the commercial to fade to black for a brief time, e.g., one second, before the next commercial begins. By quickly fading temporarily to black, an abrupt transition between the commercials can be avoided so that the attention of viewers is minimally jarred when the next commercial is presented.

Generally, station programmers try to minimize the length of the black spaces to maximize broadcasting air time. However, if a black fade period is pre-inserted into the taped commercial by the advertiser, the television station may be contractually required to maintain the exact length of commercial tape purchased by the advertiser and thus may not want to manipulate the length of the black spaces. If, on the other hand, an advertiser can be convinced that a different use of the black spaces could effectively encourage viewers to watch commercials, the content of the black spaces can then be adjusted or manipulated to result in greater benefits for the advertiser. Thus, instead of having a brief black fade period, information that may particularly interest the viewers may be projected onto the television screen, thereby enticing them to watch the commercial.

In accordance with an illustrated embodiment of the present invention, television viewers are entertained and held interested during brief random intervals which would otherwise be black spaces between commercials and programs. In particular, viewers are treated to game clues or other game components during certain randomly chosen periods which would otherwise be black space periods. Such random use of the black spaces between commercials may encourage viewers to watch all of the commercials in order to view all of the game periods.

In the illustrated embodiment, the game involves clues or hints which are randomly broadcast during air time which would normally be consumed by the black spaces. During each day or at the end of a specified number of days, such as a week or a month, new game clues are revealed randomly to viewers. At the end of each day or at the end of the specified number of days, a telephone number or an address will be flashed on the screen during one of the black spaces. The information will direct viewers to call the displayed number to report their solutions to the game. Ultimately, winners will be announced and prizes will be awarded to those winners.

BRIEF DESCRIPTION OF THE DRAWINGS

FIG. 4b is a block diagram of one example of a process of implementing the game of FIG. 4a.

DETAILED DESCRIPTION OF THE INVENTION

The following description is of the best presently contemplated mode of carrying out the invention. In the accompanying drawings, like numerals designate like parts in the several figures This description is made for the purpose of illustrating the general principles of embodiments of the invention and should not be taken in a limiting sense. The scope of the invention is best determined by reference to the accompanying claims The television game of embodiments of the present invention is designed to capture the attention and imagination of television audiences, thereby encouraging the audience to watch commercials. Embodiments of the present invention combat "zapping" of commercials by randomly flashing clues or hints on the television screen during time which, intentionally or inadvertently, would otherwise be essentially unused space. Since viewers do not know exactly when clues will be revealed, they will need to carefully watch each commercial to prepare for a new clue.

Clues are randomly inserted into the black spaces so that viewers cannot predetermine whether a clue will be revealed at any particular time. Thus, if a viewer decides to play the game, he or she must necessarily closely watch all of the commercials, or at least the beginnings and ends of the commercials, to ensure that a clue is not missed. The prize or award for solving and winning the game therefore should be sufficiently enticing to induce the viewer to attentively watch the commercials.

In order to maximize use of the black space time, whether the black spaces comprise the switching time between commercials or the fade-to-black periods inserted at the ends of many taped commercials, television station programmers can append detectable signals to the ends of the commercials and programs to indicate when a commercial or program is about to break. The detectable signal is detected by the local station and allows local stations to automatically determine when a station break will occur so that the local station can determine when to add its own television signal into the existing program without interrupting the broadcast.

In another way to detect the black spaces, a light detector senses the existence of black spaces in the television signal by measuring the luminescence level for a brief period of time. One problem with detecting black spaces and then inserting new signals, however, is that by the time the luminescence is detected and measured, the few seconds of black space may already have disappeared. In addition, such measurements may not necessarily reflect the occurrence of black spaces, as defined to be the transition between commercials, but may include signals representing momentary blackness in the substantive content of the main television program picture. Thus, it may be difficult to sift out real black space conditions as compared to mere darkness in the picture.

Figure 1:
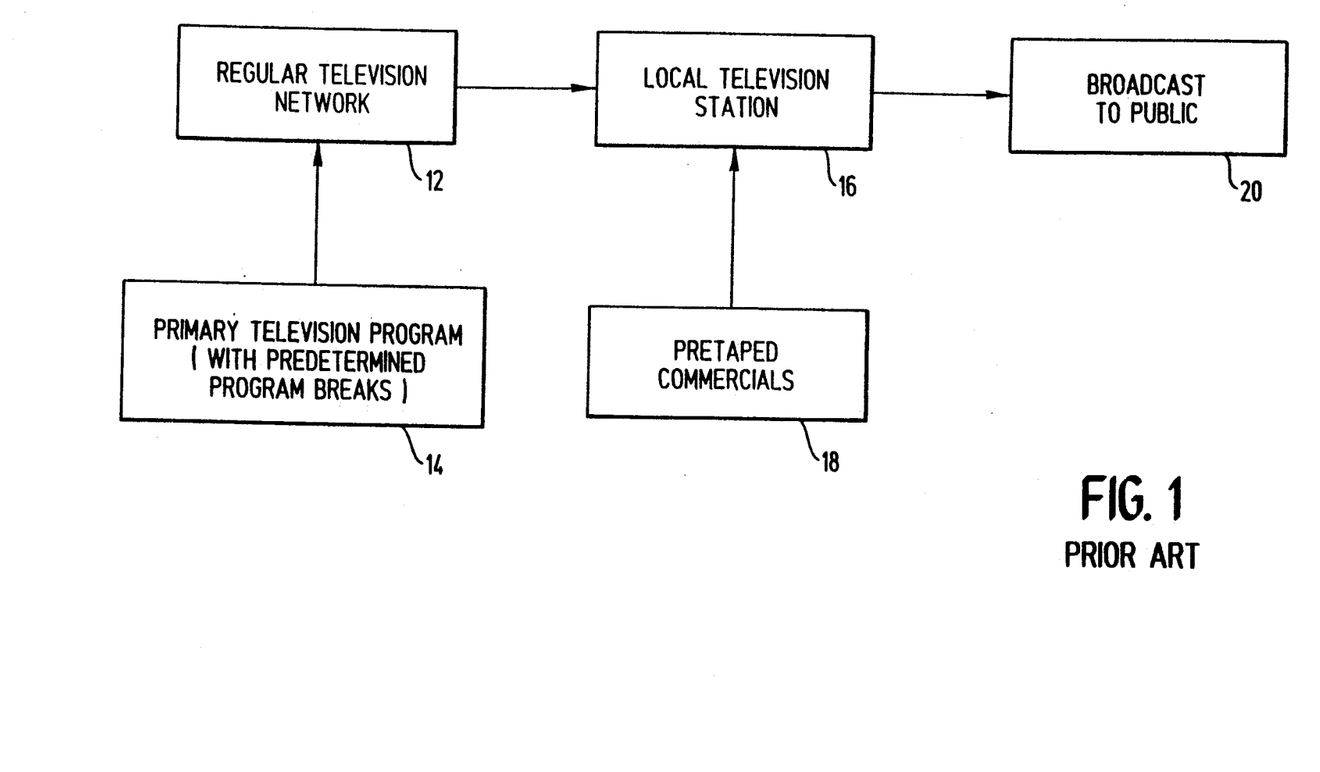
FIG. 1 is a block diagram of a general method of television broadcasting.

A diagram illustrating a general television broadcasting process is shown in FIG. 1. In FIG. 1, a "regular" television network 12 transmits primary television programs 14 to be aired by local television stations 16. Included in this network programming may be commercials which are also transmitted by the primary network with the primary program. Often, however, some or all commercials are not included as part of the substantive program fed directly from the network to the local station. Rather, the commercials 18 are pre-taped and sent to the local station 16 independently. The local station 16 then broadcasts 20 the regular network programming 14 as fed by the primary television network 12 and also broadcasts the taped commercials 18 during commercial breaks provided in the substantive program.

Figure 2A:
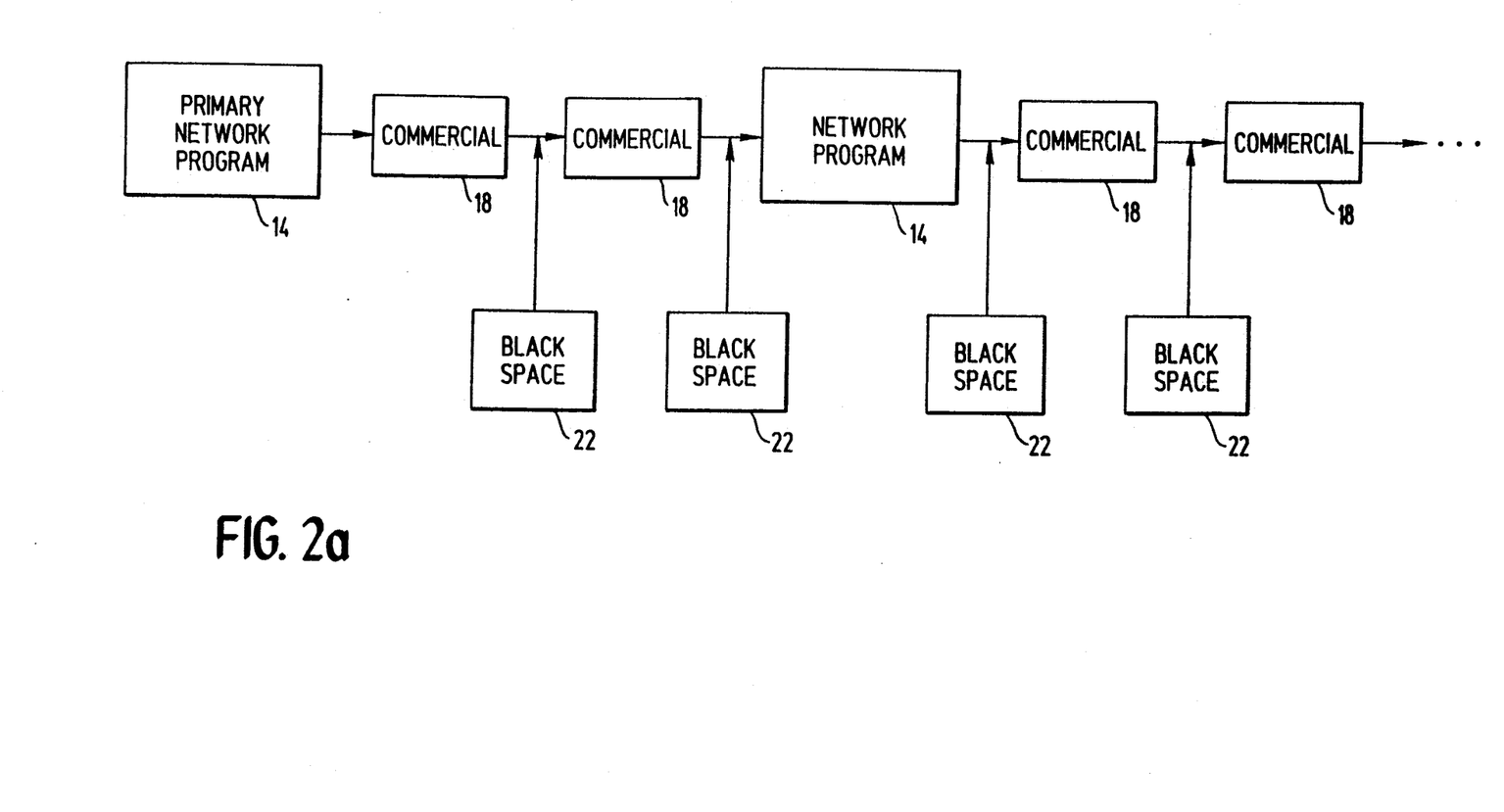
FIG. 2a is a block diagram showing how television signals representing different aspects of television programming generally occur.

Merging the commercials and programs, however, can be somewhat inaccurate when the actual length of the commercials does not precisely equal the purchased amount of time. For example, an advertising agency may supply a videotape of commercials that purportedly are two and a half minutes long, but in actuality, are two minutes and 27 seconds long. In such instances, regardless of whether the actual taped commercial is longer or shorter than the time allotted or purchased, the local station will generally allow the commercials to run for the contractual length of time purchased; although at times, commercials extending beyond the allotted time may have to be cut to avoid interruption of the regular network programming. In other words, the network-controlled programming cannot be delayed or controlled at the local television station level so that if the commercial is actually shorter than the air time allotted, a black space will occur between the commercial and other programming. An example of the occurrence and timing of black spaces 22 is shown in FIG. 2a.

Embodiments of the present invention relate to ways of using such black spaces 2a more advantageously. The black spaces 2a between the program 14 and commercials 18 and between each of the commercials 18 may be used to benefit the advertising sponsors, which in turn, will ultimately benefit the network producing the program. Regardless of how the black spaces 22 are formed, whether intentionally inserted at the beginning or end of a commercial to create a fast fade or whether the black spaces 22 represent unused space in taped commercials, or even if they merely reflect the transition time for each commercial, the total time "wasted" on black spaces can be significant.

In the diagram illustrated in FIG. 1, the local television station 16 transmits television signals containing regular programming information 14 from a primary network 12. In addition, the local station is equipped with videotapes of commercials 18 which are to be aired when a program break occur in the regular program 14. The occurrence of such program breaks are predetermined by the primary network 12, although the timing of the breaks is reported to the local station 16 beforehand. Typically, just before a break is about to begin, the station programmer will manually preset the commercials 18 so that the commercials are aired immediately after the program 14 picture disappears from the screen. However, because the specific timing of each of the commercial breaks may not be completely exact and also because the reaction time and preparation by a station programmer may not always be perfectly precise, human error may be a factor in the length and occurrence of black spaces 22.

Figure 2B:
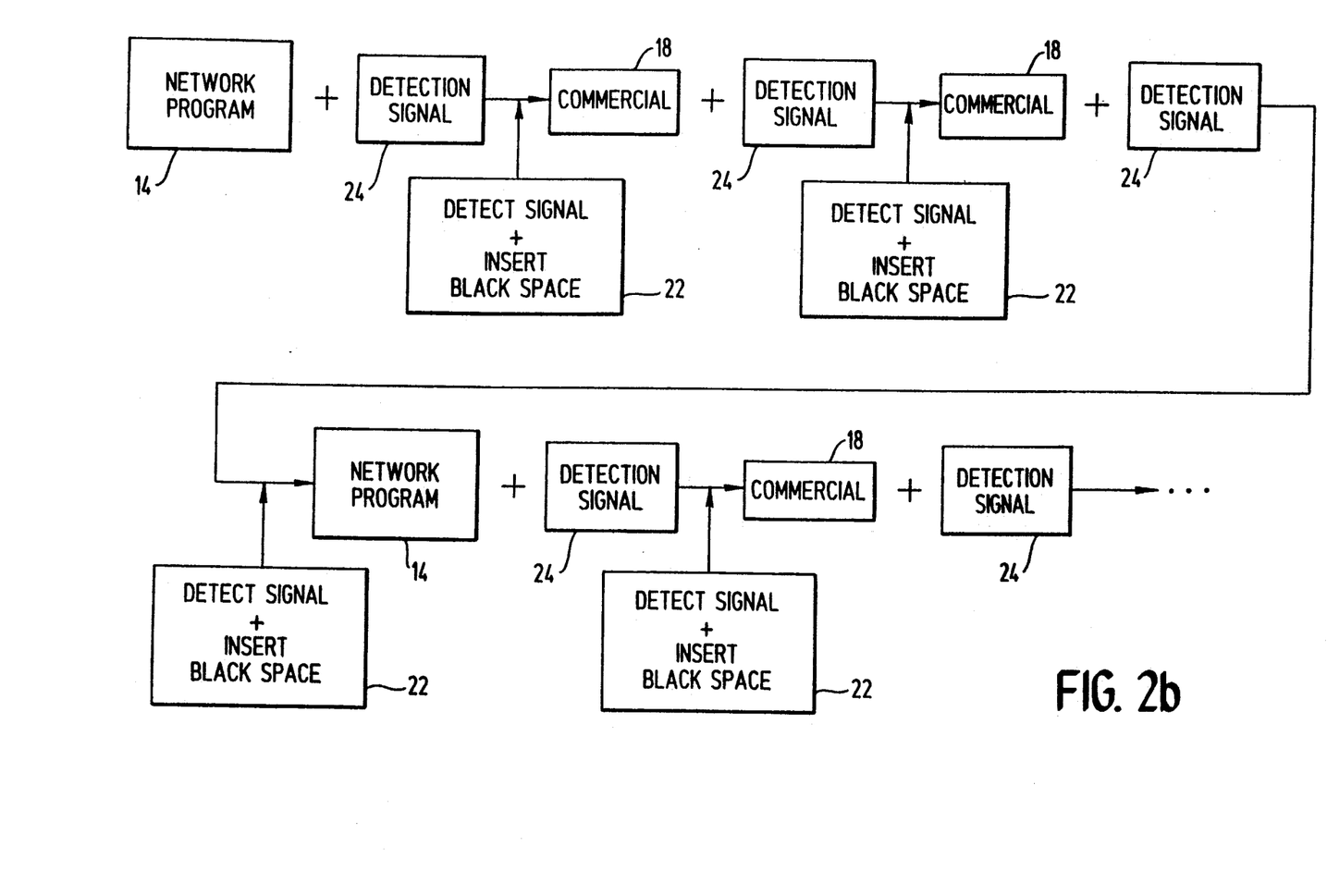
FIG. 2b is a block diagram showing an arrangement of television signals representing different aspects of television programming in accordance with one embodiment of the present invention.

Thus, in accordance with one embodiment of the present invention, these effects of human error may be minimized or avoided by inserting detectable detection signals, as indicated in FIG. 2b, at the ends of the program and each commercial to provide automatic determination of the actual ends or breaks in the program and commercials. The use of detection signals 24 lessens the burden on the local station programmer who would otherwise be required to closely monitor the television signals to determine when the program 14 and commercials 18 end in order to run a new tape. Detection signals 24 may also be inserted at the beginnings of the program segments 14 following commercial breaks to indicate when a commercial 18 may need to be shortened.

The detection signals 24 also enable detection of upcoming black spaces 22 between the programs 14 and commercials 18. The unused black space time can then effectively be used for other programming. Thus, rather than requiring a block of expensive air time to display the game clues of the present invention, the utility of black spaces 22 between the allotted blocks of program 14 and commercial 18 time can instead be maximized in a way that retains and even increases viewership of the commercials.

Figure 3:
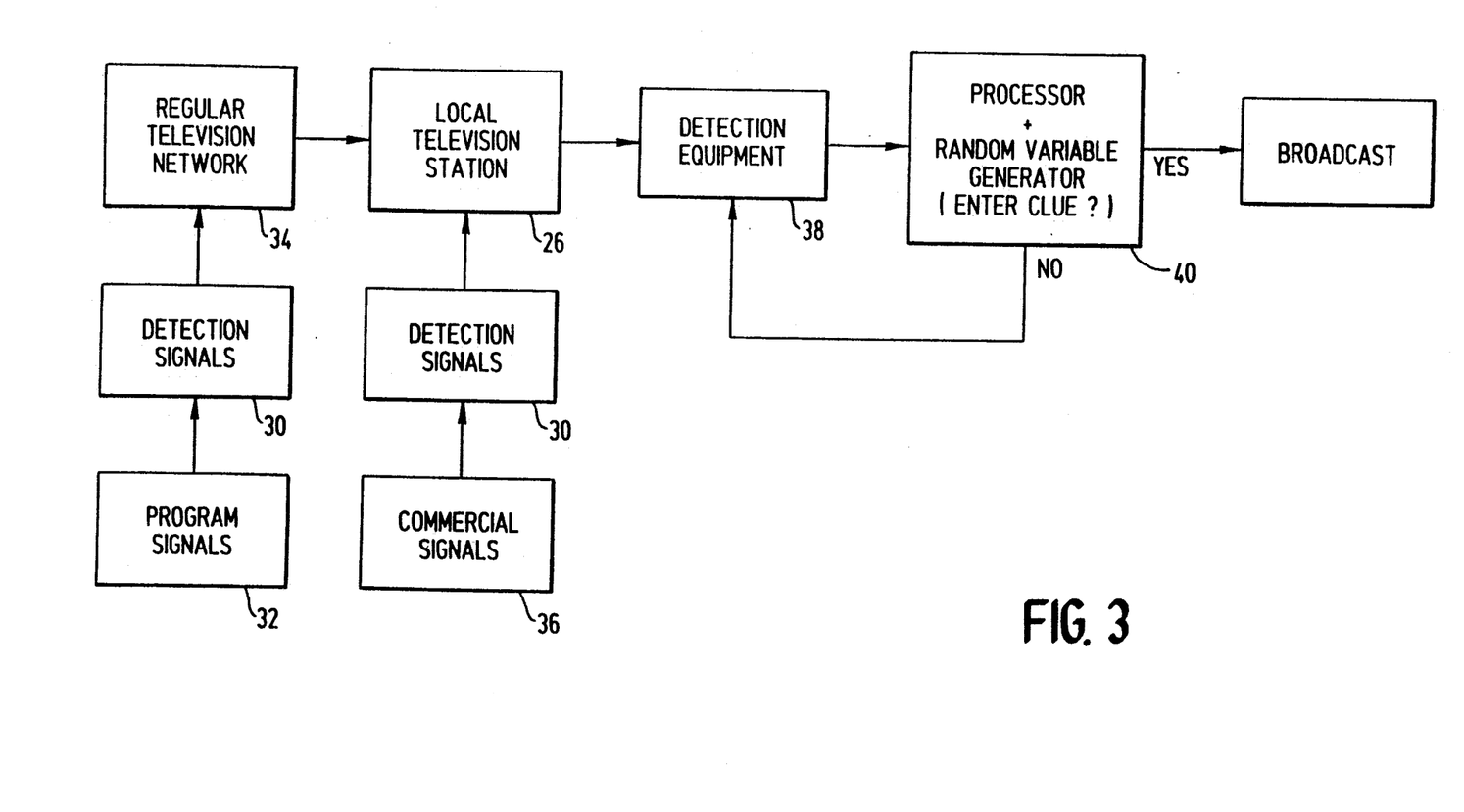
FIG. 3 is a block diagram showing the implementation of a game in accordance with another embodiment of the present invention.

As shown in FIG. 3, a local television station 26 is equipped with detection instruments 28 which detect cues or detection signals 30 in the television transmission signals 32 which are fed to a local television station 26 by a primary network 34. The taped commercials 36 which ar maintained by the local station 26 are also provided with detection signals 30. As described above, the detection signals 30 indicate when a program 32 or commercial 36 is about to break or end. When a detection signal 30 is detected 38 by the local station 26, a processor 40 which is provided with a random variable generating means may be used to determine whether a clue will be aired during the black space immediately after the end of the program or commercial. Depending on the total number of clues revealed for a certain game, the time between clues may vary markedly.

Figure 4A:
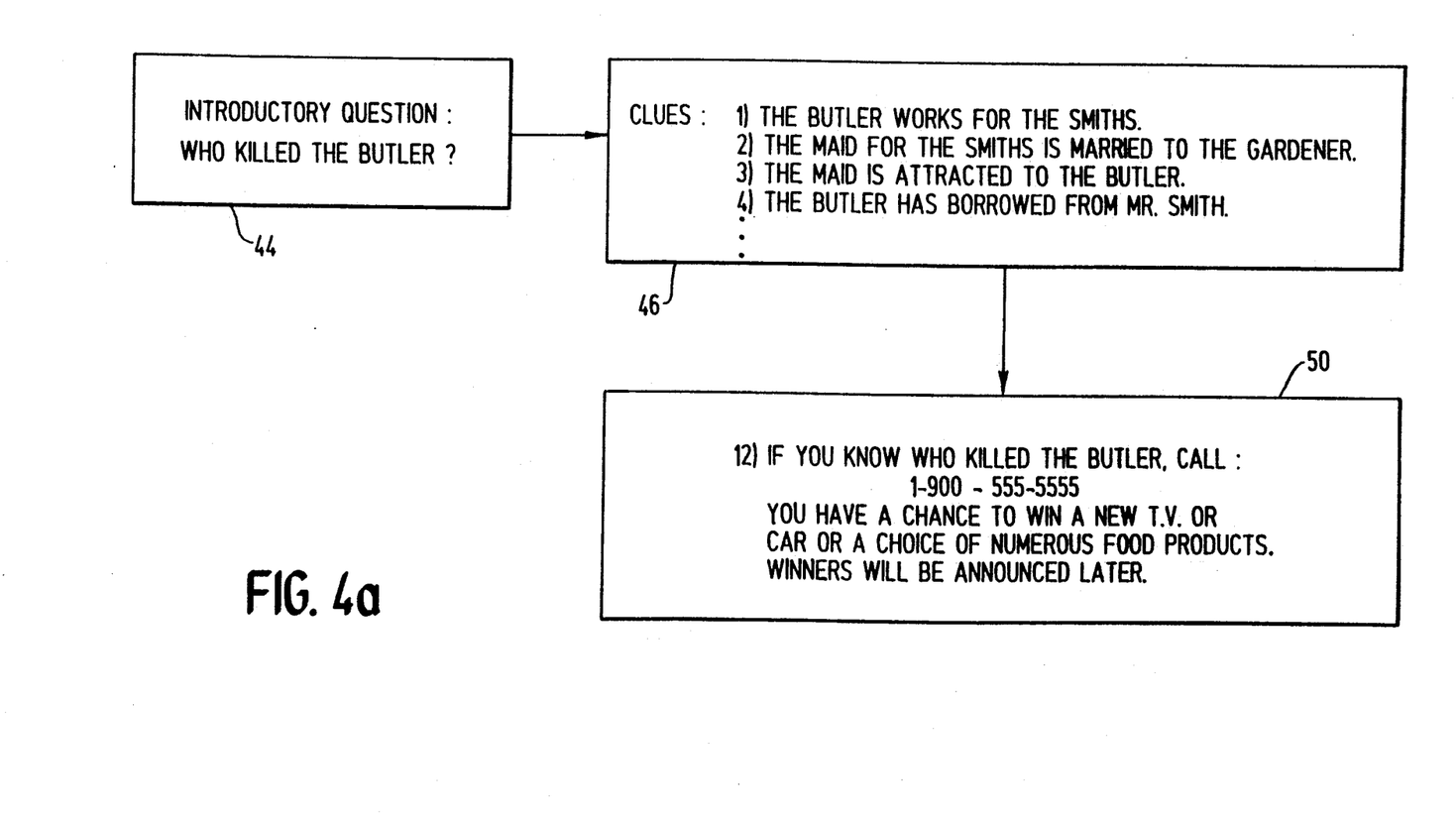
FIG. 4a is a diagram of the displays for a television game in accordance with one embodiment of the present invention.

In a preferred embodiment described in FIG. 4a, the game is directed to mystery question 44 which is solved after a number of clues 46 are revealed. Initially, the introductory question may be aired during one of the black spaces 48, indicated in FIG. 4b. Thereafter, clues 46 will be randomly inserted into the black spaces 48; the clues 46 will lead to the solution to the mystery. Each week or so a new series of clues will be revealed to the viewers in the black spaces between the program and commercial breaks during the particular substantive program. As described above, the seemingly random timing of the clues is intended to greatly enhance viewership of the commercials since the viewers or participants must watch all or most of the commercial breaks in order to compile enough clues to formulate the correct answer.

Figure 4B:
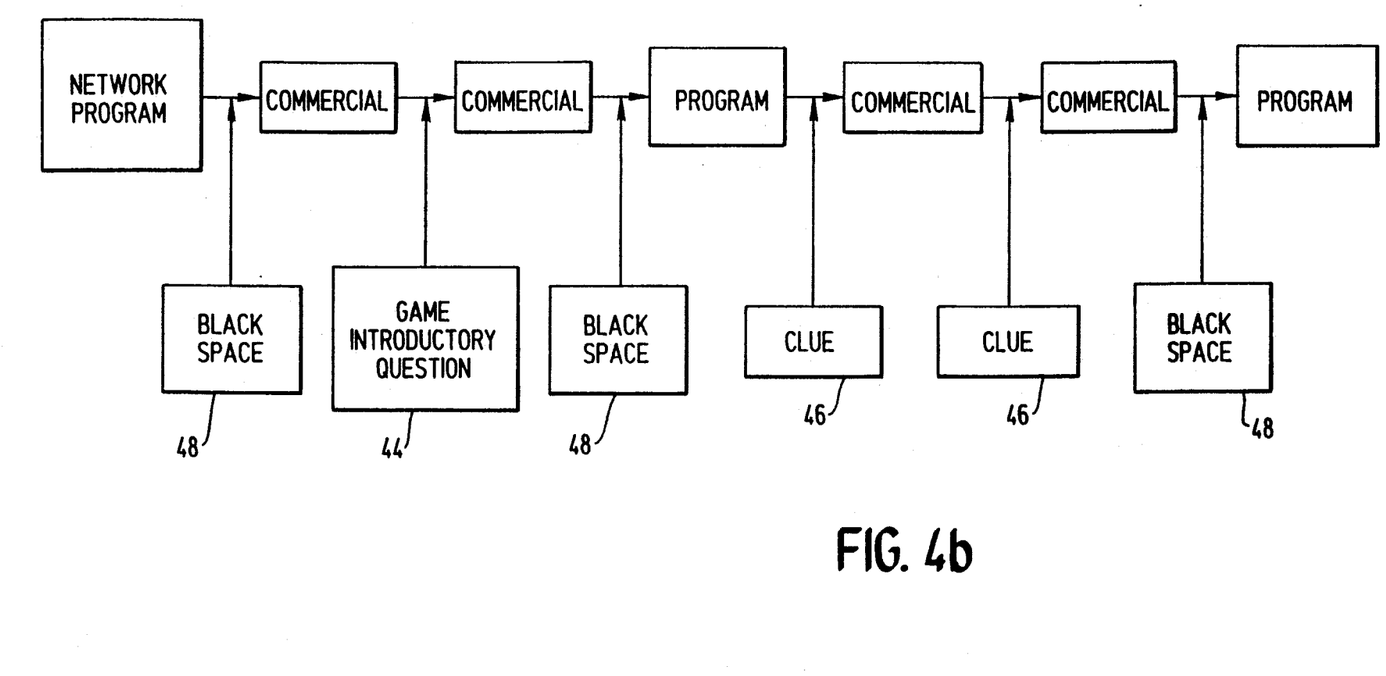

At the close of each game, a final message 50 will be projected into one of the black spaces. The message may flash a final clue or information about how viewers can report their solutions to the clues. Other information may also be announced, such as prizes, awards and details of upcoming games. Finally, after viewers have called or mailed in their answers and a single viewer or multiple viewers are determined to be the winners, their names may be announced or reported during one of the black spaces.

Figure 5A:
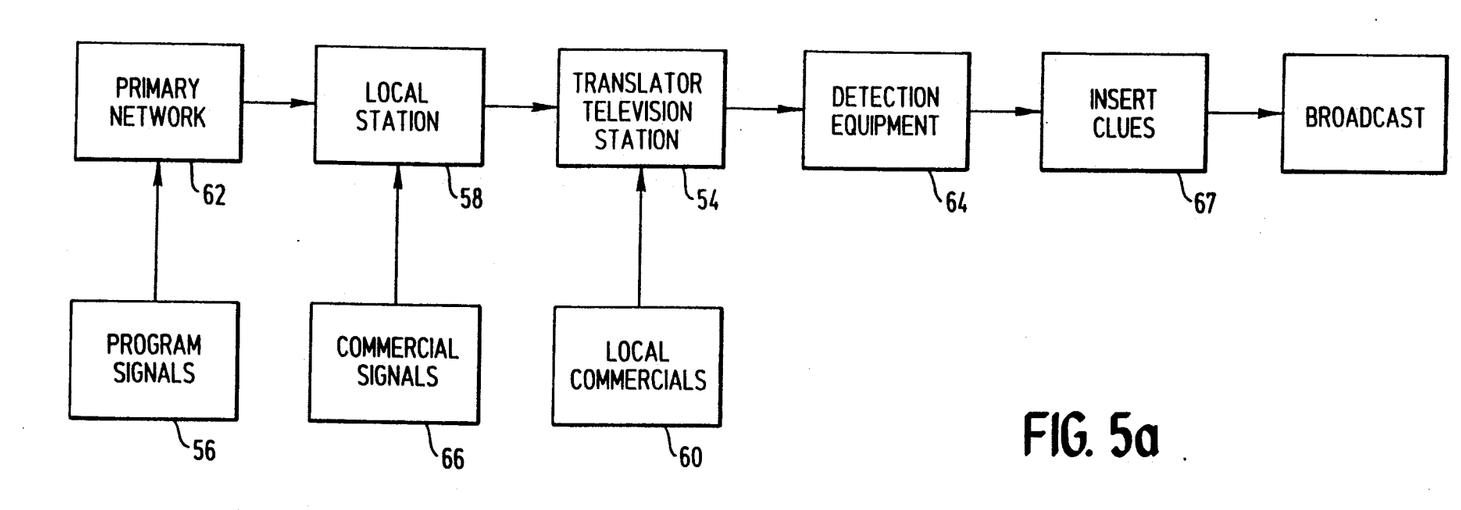
FIG. 5a is a block diagram showing a process of implementing a game in accordance with yet another embodiment of the present invention.

In an alternate method for detecting and manipulating the black spaces as seen in FIG. 5a, a translator television station 54 having a detection/insertion system may be used to reveal the clues. A translator station 54 is an intermediate, low-power station which receives programming information 56 from a larger local station 58. The translator station 54 typically inserts independent local commercials 60, which are not fed from the main station 58 or the primary network 62, into predetermined breaks in the programming. These commercials 60 are generally sent by local advertisers who may produce and videotape the commercials 60 themselves before sending them directly to the translator 54 station to be aired locally. In addition, since the translator stations 54 may be equipped with detection equipment 64 to detect black spaces by detecting the ends of the programs 56 or commercials 66, the translator station 54 also has the ability to insert game clue signals into the breaks between the substantive programming.

Figure 5B:
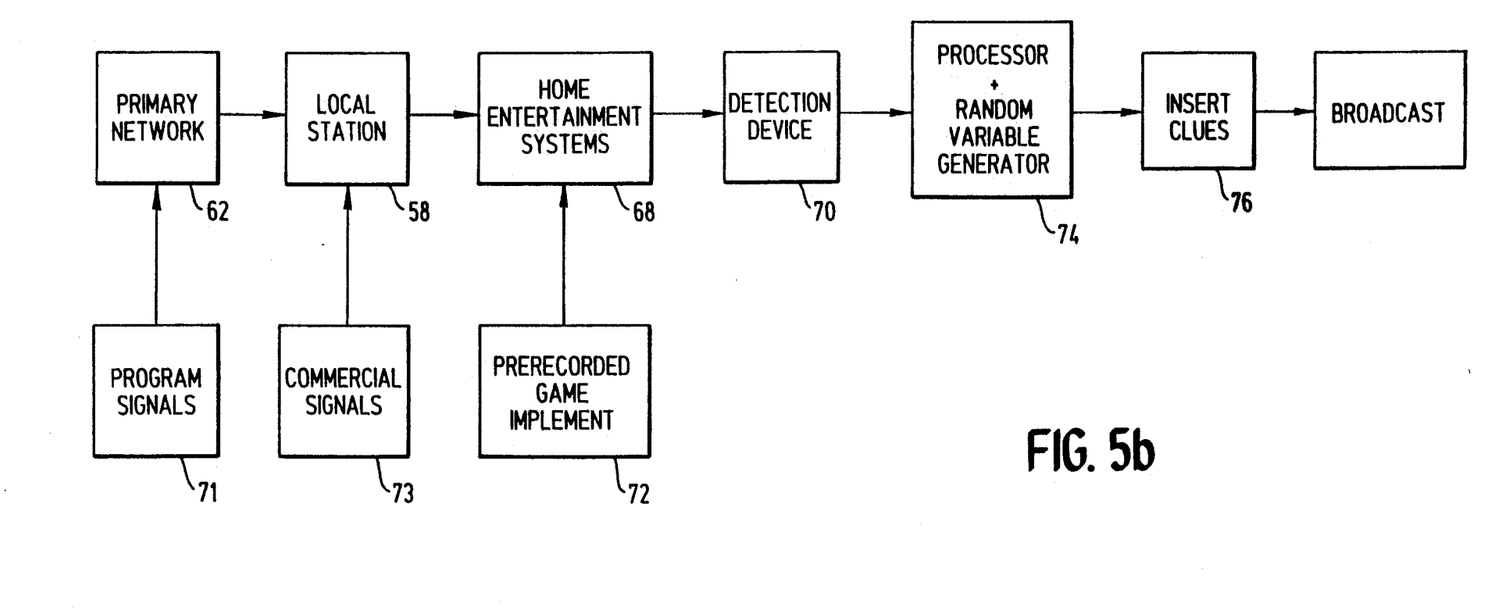
FIG. 5b is block diagram showing a process of implementing a game in accordance with still another embodiment of the present invention.

Similarly, in a different embodiment, a home entertainment system 68 is equipped with a detection device 70, as shown in FIG. 5b. When a detection signal at the end of a program 71 or commercial 73 is detected, the detection device 70 determines if a clue which has been pre-recorded on a separate video medium 72, should be flashed on the screen during the black space period. The separate video medium 72 essentially discloses the game in a form independent of the television station, but which cannot be viewed without detection of television program and commercial signals. The detection device 70 includes a processor 74 provided with random variable generator that controls when a clue will be inserted 76 into one of the black spaces. The taped clues 72 cannot be read or viewed except through the detection device 70 such that the display of the clues must necessarily occur during program and commercial breaks, after the detection signals have been detected.

Figure 6:
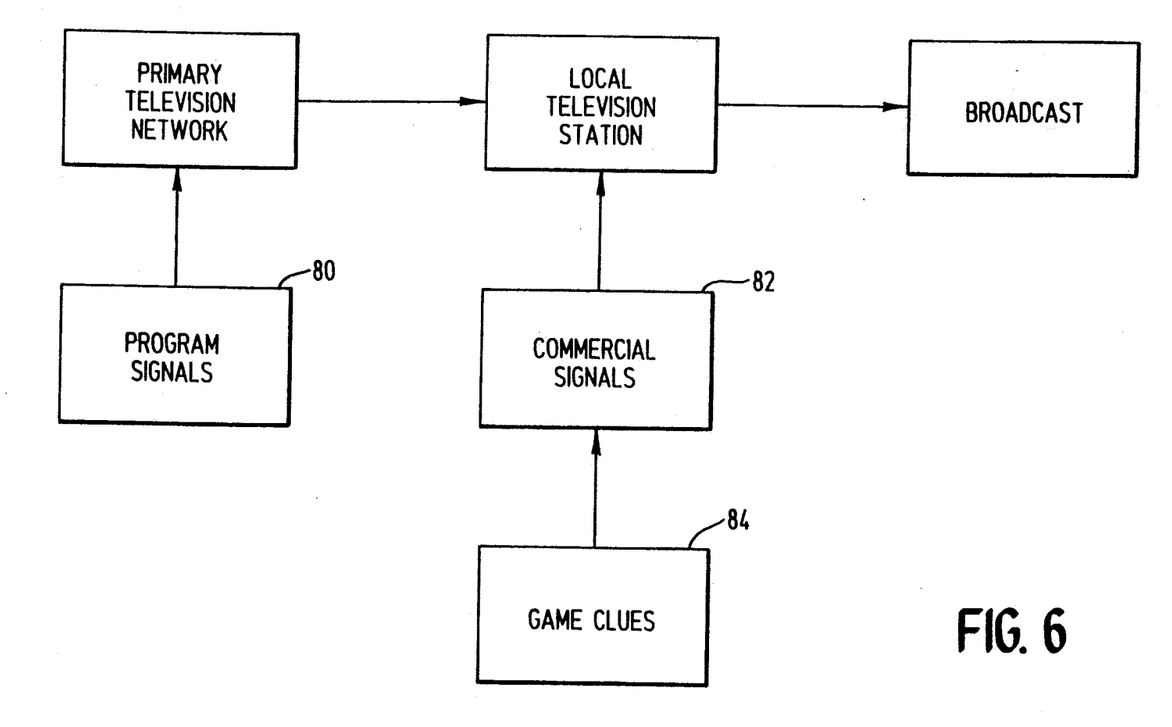
FIG. 6 is block diagram showing a process of implementing a game in accordance with further still another embodiment of the present invention

FIG. 6 describes a separate embodiment of the present invention. Rather than detecting the ends of programs 80 and commercials 82 in order to insert a clue into the black spaces therebetween, the clues 84 are aired during regular programming time, albeit in significantly briefer segments. For example, a clue may be aired during a one or two second time slot at the end of a taped commercial which, due to inaccurate measurements, happens to be shorter than the time allotted by contract with the television station. Or, depending on external negotiations with television advertising agencies, the clue may be inserted at the end of a commercial which has already provided for a fade-to-black period, wherein the clue will either shorten the fade time or replace it altogether. During the brief spots, which are aired randomly during the game time period, e.g., a week, clues will be revealed. In this case, since the clues can only be revealed during time slots which are variable according to errors in calculating the total running time of an existing commercial or by appending the clues to the fade period of existing commercials, the display of the clues is inherently random.

Figure 7:
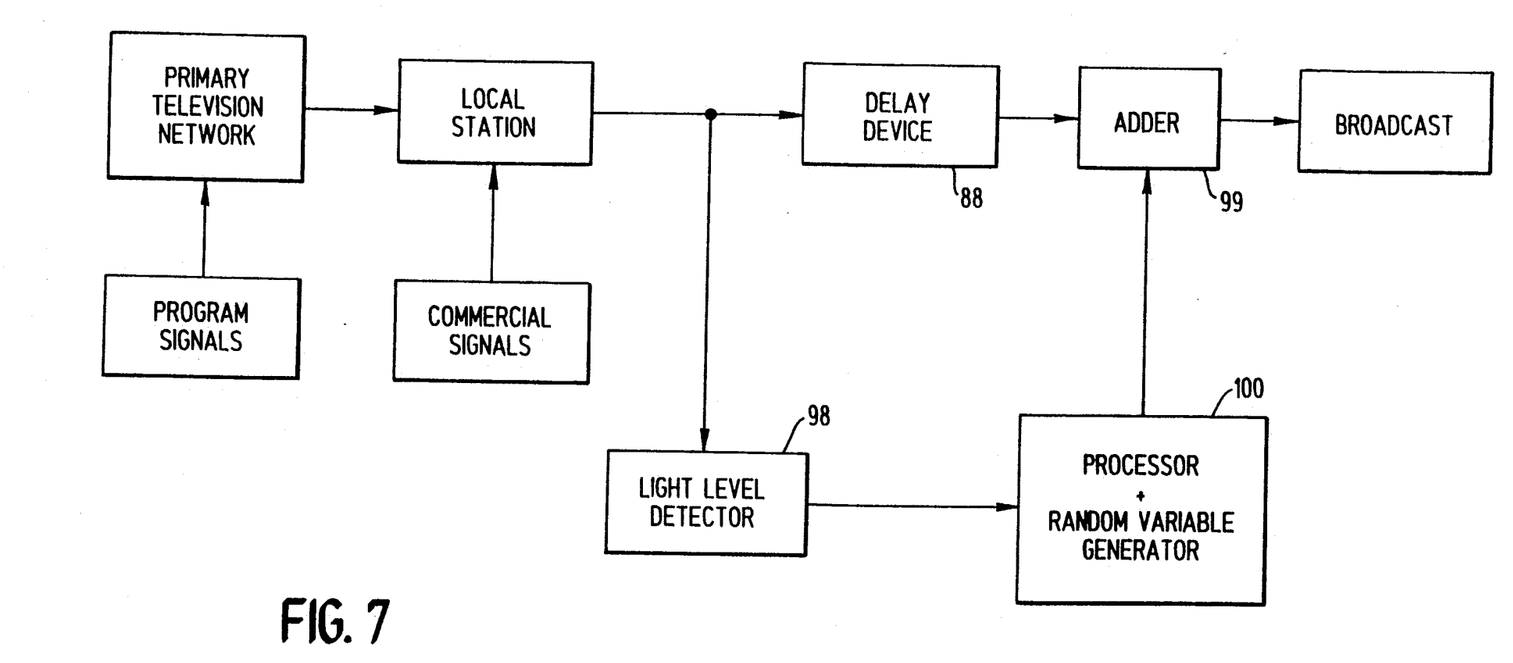
FIG. 7 is block diagram showing a process of implementing a game in accordance with another embodiment of the present invention.

In yet another separate embodiment depicted in FIG. 7, a light level detector 98 detects light and dark picture signals by measuring the luminescence of the signals. The program and commercial signals pass through a delay device 88 so that a full period of black space signals can be processed to determine when and how long a black space will be available for insertion of a game clue. Once a full black space is detected and processed, a processor 100 having a random variable generating means receives information about the upcoming black space and determines whether a clue should be inserted. At the appropriate time deteremined by the processor 100, an adder 99 adds a signal corresponding to a clue to the signal exiting the delay device 88. For example, if darkness is detected for a specific minimum period of time, e.g., two seconds, the processor will determine whether a clue should be inserted into the two second time slot, wherein this insertion occurs immediately after learning of the existence of a black space so that the short period can be used effectively.

It is seen from the above that embodiments of the present invention provide a unique television game for entertaining television audiences and encouraging viewership of commercials. It will, of course, be understood that modifications of the present invention, in its various aspects, will be apparent to those skilled in the art, some being apparent only after study and others being matters of routine mechanical design. For example, different messages other than a mystery question and clues may be inserted into the black spaces. In fact, any type of information may be displayed during the black spaces. In addition, the air time during which the game is conducted may comprise regular television programming slots as well as the black spaces between programs and commercials. As such, the scope of the invention should not be limited by the particular embodiments herein described but should be defined only by the appended claims and equivalents thereof.

We claim:

1. A television game for viewer participation comprising:

television program signals corresponding to a television program, the television program signals being divided by television breaks and transmitted to viewers;

television commercial signals corresponding to at least one commercial, the television commercial signals being transmitted during the television breaks;

a plurality of black space signals being transmitted between the television program signals and commercial signals and between the commercial signals;

detection signals added to at least one of the television program signals and the commercials transmitted by the television commercial signals, wherein the detection signals indicate that one of the black spaces is about to occur;

signal detection means for detecting the detection signals added to the television program and commercial signals;

processor means operatively connected to the signal detection means for determining when each black space is about to occur and for randomly selecting at least one of the black spaces;

game information insertion means for inserting game information comprising at least one of introductory information, game clues and instructions into the randomly selected black spaces.

2. The game according to claim 1, further comprising home game control means for enabling viewer control of the insertion of the game information.

3. A television game for viewer participation comprising:
   television program signals divided by television breaks, the television program signals being transmitted to viewers;
   television commercial signals which are transmitted during the television breaks, the television commercial signals representing at least one commercial, wherein at least one period of time in which a predetermined low light level is transmitted occurs between at least one of a program signal and a commercial signal and commercial signals;
   light detection means for detecting at least one low light period, wherein each low light period indicates a black space;
   processing means, operatively connected to the light detection means, for randomly selecting at least one low light period detected by the light detection means;
   game information insertion means, operatively connected to the light detection means, for inserting game information comprising at least one of introductory information, game clues and instructions into the randomly selected at least one low light period.

4. The game according to claim 3, further comprising a delay means for delaying the transmission of the television program signals during detection of low light periods by the light detection means such that the low light periods are detected before the transmission of the television program signals.

* * * * *